US012591101B2

(12) United States Patent
Radichel et al.

(10) Patent No.: US 12,591,101 B2
(45) Date of Patent: \*Mar. 31, 2026

(54) SYSTEM AND METHOD OF MAPPING A DUCT

(71) Applicant: Condux International, Inc., Mankato, MN (US)

(72) Inventors: Bradley P. Radichel, Edina, MN (US); Joshua J. Siebert, Lake Crystal, MN (US); David J. Stockton, Woodbrige (GB); Eric L. Cope, Mankato, MN (US)

(73) Assignee: Condux International, Inc., Mankato, MN (US)

( * ) Notice: Subject to any disclaimer, the term of this patent is extended or adjusted under 35 U.S.C. 154(b) by 330 days.

This patent is subject to a terminal disclaimer.

(21) Appl. No.: 17/575,441

(22) Filed: Jan. 13, 2022

(65) Prior Publication Data

US 2022/0252202 A1     Aug. 11, 2022

Related U.S. Application Data

(63) Continuation of application No. 15/570,597, filed as application No. PCT/US2016/029816 on Apr. 28, 2016, now Pat. No. 11,255,479.

(60) Provisional application No. 62/154,470, filed on Apr. 29, 2015.

(51) Int. Cl.
| | |
|---|---|
| *G02B 6/50* | (2006.01) |
| *F16L 55/48* | (2006.01) |
| *F16L 101/30* | (2006.01) |
| *G02B 6/52* | (2006.01) |

(52) U.S. Cl.
CPC ................ *G02B 6/50* (2013.01); *F16L 55/48* (2013.01); *F16L 2101/30* (2013.01); *G02B 6/52* (2013.01)

(58) Field of Classification Search
CPC ........ C08G 63/06; C08G 63/78; C08G 63/88; C08J 3/03; C08J 3/12; C08J 3/28; C08J 2367/04; C08L 67/04; C08L 97/02
See application file for complete search history.

(56) References Cited

U.S. PATENT DOCUMENTS

| | | | |
|---|---|---|---|
| 3,862,497 | A | 1/1975 | Vernooy et al. |
| 3,973,441 | A | 8/1976 | Porter |
| 4,305,537 | A | 12/1981 | Samokovliiski et al. |

(Continued)

FOREIGN PATENT DOCUMENTS

| | | |
|---|---|---|
| DE | 10106614 C1 | 5/2002 |
| DE | 202015004691 U1 | 7/2015 |

(Continued)

OTHER PUBLICATIONS

European Patent Office; Communication with European Search Report for Application No. 17869560.7 mailed Jun. 8, 2020, 8 pages.

(Continued)

*Primary Examiner* — Douglas Kay
(74) *Attorney, Agent, or Firm* — Merchant & Gould P.C.

(57) ABSTRACT

A unit that houses tracking electronics configured to be passed through a duct while the tracking electronics collect position information is provided. The information collected by the unit is used to map the duct. A method of mapping a duct is also provided.

17 Claims, 1 Drawing Sheet

(56)                References Cited

U.S. PATENT DOCUMENTS

| | | |
|---|---|---|
| 4,372,161 A | 2/1983 | de Buda et al. |
| 4,495,808 A | 1/1985 | Fischer, III |
| 4,541,278 A | 9/1985 | Marsh et al. |
| 4,747,317 A | 5/1988 | Lara |
| 4,835,876 A | 6/1989 | Petermann et al. |
| 4,856,760 A | 8/1989 | Frost et al. |
| 4,959,810 A | 9/1990 | Darbee et al. |
| 5,390,841 A | 2/1995 | Horiuchi et al. |
| 5,485,148 A | 1/1996 | Tseng |
| 5,551,545 A | 9/1996 | Gelfman |
| 5,675,251 A | 10/1997 | McLean et al. |
| 5,813,658 A | 9/1998 | Kaminski et al. |
| 5,906,357 A | 5/1999 | Munson, Sr. |
| 6,012,621 A * | 1/2000 | Hoium .................... H02G 1/08 226/35 |
| 6,059,264 A | 5/2000 | Kaminski et al. |
| 6,264,171 B1 | 7/2001 | Hoium et al. |
| 6,364,290 B1 | 4/2002 | Barker |
| 6,540,208 B1 | 4/2003 | Pecot et al. |
| 6,746,000 B2 | 6/2004 | Watanabe et al. |
| 6,935,425 B2 | 8/2005 | Aronstam |
| 7,100,463 B2 | 9/2006 | Boudreaux |
| 7,210,364 B2 | 5/2007 | Ghorbel et al. |
| 7,317,308 B2 | 1/2008 | Fagbayi et al. |
| 7,498,816 B1 | 3/2009 | Olsson et al. |
| 7,562,861 B2 | 7/2009 | Fee et al. |
| 7,594,448 B2 | 9/2009 | Jacobson et al. |
| 7,623,961 B2 | 11/2009 | Van Den Broeck |
| 7,841,249 B2 | 11/2010 | Tormoen |
| 7,845,419 B2 | 12/2010 | Naumann |
| 8,001,858 B2 | 8/2011 | Cogen et al. |
| 8,051,524 B2 | 11/2011 | Ferreira Lino et al. |
| 8,261,623 B2 | 9/2012 | Miller et al. |
| 8,395,661 B1 | 3/2013 | Olsson et al. |
| 8,491,722 B2 | 7/2013 | Phipps |
| 8,547,428 B1 | 10/2013 | Olsson et al. |
| 8,655,596 B2 | 2/2014 | Ekseth et al. |
| 8,661,909 B2 | 3/2014 | Chu et al. |
| 8,689,653 B2 | 4/2014 | Cogen et al. |
| 8,720,030 B2 | 5/2014 | Barker et al. |
| 8,765,061 B2 | 7/2014 | Tunheim et al. |
| 8,775,083 B2 | 7/2014 | Young et al. |
| 9,156,665 B2 | 10/2015 | Yoder et al. |
| 9,535,228 B2 | 1/2017 | Barker |
| 9,780,540 B2 | 10/2017 | Griffioen |
| 11,025,039 B2 * | 6/2021 | Radichel .................. G02B 6/52 |
| 11,255,479 B2 | 2/2022 | Radichel |
| 2004/0211258 A1 | 10/2004 | Geen |
| 2005/0198063 A1 | 9/2005 | Thomas et al. |
| 2006/0219992 A1 * | 10/2006 | Fee .......................... G02B 6/52 254/134.4 |
| 2006/0290779 A1 * | 12/2006 | Reverte .................... E03F 7/10 348/84 |
| 2007/0269269 A1 | 11/2007 | Coronado et al. |
| 2008/0011990 A1 * | 1/2008 | Kostet .................. G02B 6/4457 254/134 |
| 2008/0012720 A1 | 1/2008 | Rostron |
| 2009/0065547 A1 | 3/2009 | Heatley |
| 2009/0188059 A1 | 7/2009 | Albrecht et al. |
| 2010/0236811 A1 | 9/2010 | Sasse et al. |
| 2010/0296519 A1 | 11/2010 | Jones |
| 2011/0125462 A1 | 5/2011 | Petrosky et al. |
| 2011/0239222 A1 | 9/2011 | Wu |
| 2012/0061633 A1 | 3/2012 | Holley |
| 2012/0118085 A1 | 5/2012 | Christie |
| 2012/0168699 A1 | 7/2012 | Rachminov et al. |
| 2012/0257042 A1 * | 10/2012 | McKaigue .......... G01N 21/954 348/E7.087 |
| 2013/0030704 A1 | 1/2013 | Young et al. |
| 2013/0200055 A1 | 8/2013 | Enyedy et al. |
| 2013/0256613 A1 | 10/2013 | Hyde et al. |
| 2014/0013872 A1 | 1/2014 | Thursby |
| 2014/0048286 A1 | 2/2014 | Rojas |
| 2014/0209126 A1 | 7/2014 | Doig |
| 2015/0316041 A1 | 11/2015 | Chen |
| 2016/0159509 A1 | 6/2016 | Lewis et al. |
| 2016/0202431 A1 * | 7/2016 | Hill ...................... G02B 6/3874 385/78 |
| 2020/0395743 A1 * | 12/2020 | Griffioen ............... H02G 1/086 |

FOREIGN PATENT DOCUMENTS

| | | | |
|---|---|---|---|
| EP | 0911452 A2 | 4/1999 | |
| FR | 2577724 A1 | 8/1986 | |
| GB | 1508261 A | 4/1978 | |
| GB | 2088554 A | 6/1982 | |
| JP | 2012-173086 A | 9/2012 | |
| WO | 92/09847 A1 | 6/1992 | |
| WO | 2006103419 A1 | 10/2006 | |
| WO | 2012/165824 A2 | 12/2012 | |
| WO | 2013/169200 A1 | 11/2013 | |
| WO | WO-2016159434 A1 * | 10/2016 | .............. F16L 55/28 |
| WO | 2016/176467 A1 | 11/2016 | |

OTHER PUBLICATIONS

International Search Report and Written Opinion for PCT/US2017/061621, mailed Mar. 26, 2018.

International Search Report and Written Opinion for PCT/US2016/29816, mailed Aug. 12, 2016.

"Fiber Optic Cable Blowing", product manual, Condux International, Inc., accessed on Apr. 25, 2016.

* cited by examiner

SYSTEM AND METHOD OF MAPPING A DUCT

This application is a Continuation of U.S. application Ser. No. 15/570,597, filed on Oct. 30, 2017, which is a National Stage application of PCT International Patent Application No. PCT/US2016/029816, filed on Apr. 28, 2016, which claims priority to U.S. Provisional Patent Application No. 61/154,470, filed Apr. 29, 2015, the disclosures of which are hereby incorporated by reference in their entireties. To the extent appropriate a claim of priority is made to each of the above-disclosed applications.

TECHNICAL FIELD

A system and method for mapping a duct involving blowing a data recording unit through a duct and collecting data from the unit to map the duct.

BACKGROUND

Ducts, conduits and pipes, which are terms used herein interchangeably, are often preinstalled in areas that are difficult to access (underground, crawl spaces, in walls, etc.). It is often desirable to know the path of the ducts including the length of the ducts, what bends exist, and the degree and direction of each of the bends. This is because the length and complexity of the route (bends and inclines) affects the distance that a cable can be installed into that duct. This is the case irrespective of whether the cable is to be installed by any of the well-known techniques including fluid propulsion (gas or liquid), pushing or pulling. In the situation described below, the common technique of air-blowing is referred to but the principles can be extended to the other techniques listed above.

For example, prior to installing fiber optic cables into a duct, it is desirable to map the duct to determine how best to install the cable. If the duct is generally straight, it may be possible to install the fiber optic cable all in one shot. However, if the duct takes a twisted path, it might need to be installed in two or more blowing steps. Without the benefit of duct mapping the fiber optic cable installer would need to guess at the best location from which to blow the cable and guess how many steps may be required. If the operator over-estimates the ability to blow the cable, the cable can become stuck at an inconvenient location (e.g., in a duct buried in a cement wall, in a duct deep under a road) requiring retracting the cable and reinstalling it from another location, or worse excavating at the inconvenient location to free the cable. This trial and error process is time consuming and inefficient. On the other hand, if the operator underestimates the ability to blow the cable and chooses to blow the cable in multiple stages, this may also be inefficient. In situations where the duct is generally level and straight with only gradual curves, it may be possible to install the cable in fewer steps than would be expected. Accordingly, accurate mapping of the duct can improve the installation of cable within the duct. Many other advantages of duct mapping exist for example the possibility to overlay the recorded data onto a Graphical Interface System (GIS) to provide a real world ('as built') record of the cable and duct deployment. In addition it may be possible to download the routing information onto an electronic interface for controlling the installation process.

SUMMARY

The present disclosure provides a unit that contains tracking electronics. The unit is configured to be passed through the duct while the tracking electronics collects position information. The information collected by the unit can be used to map the duct. A method of mapping a duct is also provided.

DETAILED DESCRIPTION

Figure 1:
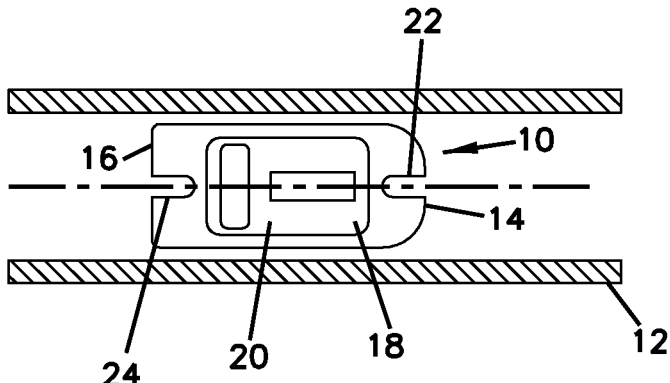
FIG. 1 is a side elevation view of a unit according to the present disclosure in a straight duct.
Figure 2:
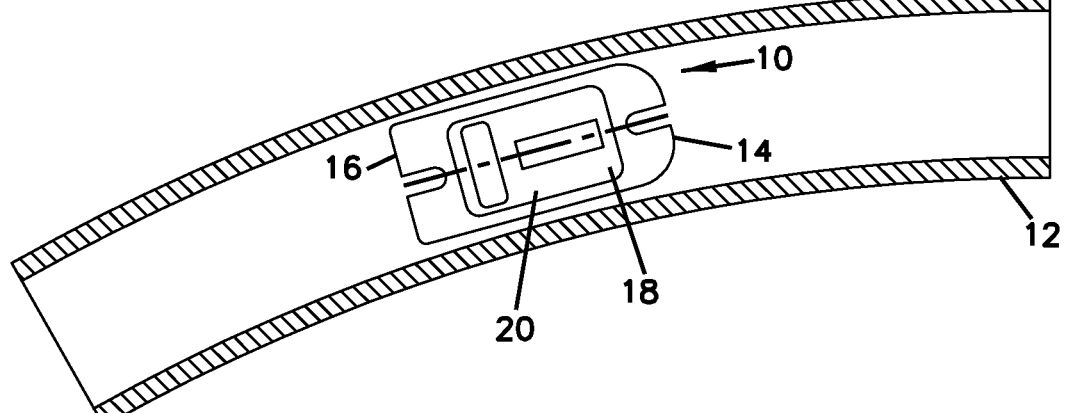
FIG. 2 is a side elevation view of the unit of FIG. 1 in a curved duct.

Referring to the FIGS., systems for mapping a duct according to the present disclosure are described herein in further detail. In the depicted embodiment the system includes a unit 10 configured to be passed through a duct 12. The unit 10 includes a body portion having a first end portion 14 and a second end portion 16. The body portion defines an internal cavity 18 configured to house electrical components 20 therein. In the depicted embodiment, the first end portion 14 includes a rounded leading surface and the second end portion 16 defines a trailing surface. A device configured to drive the unit 10 through a duct 12, for example, a blower. The system can also include a processor configured to receive information collected by the unit 10 as the unit travels through the duct 12 to map the duct 12.

In the depicted embodiment, the electrical components include a battery, a six degree of freedom microprocessor chip, as well as memory and communication electronics. The 6 degree of freedom feature is useful in that it provides 3-axis acceleration, 3-axis angular rate and brain functions. In the depicted embodiment, the electrical components are connected together to form a modular electrical unit. The modular electrical unit is configured to be removed from one unit and placed into another unit. The system can include multiple units of various sizes, each of the units configured to receive the modular electrical unit. The selection of the proper unit for a particular application can depend on the type and size of the duct. It should be appreciated that many other types of electrical components can be carried by the unit. For example, the electrical components could also include a toxic material sensor, magnetic field detector, pressure sensor, moisture sensor, or infrared scanner.

As discussed above, the unit 10 is configured to collect position data as it moves through the duct. In some embodiments the unit 10 is configured to transmit data so that it can be tracked as it moves through the duct. In addition to collecting position data, unit 10 can be configured to clean the duct as it moves through the duct 12, or alternatively to transfer lubricant to the duct surface. In the depicted embodiment, the unit 10 is configured to be connected with other units. The each units can be configured for their own functions (e.g., one unit could be for cleaning, another for detecting moisture, another for tracking position). In the depicted embodiment, the first end portion 14 includes a pulling eye 22 configured to connect to a duct pull cord and/or to connect to another unit, and the second end portion 16 includes an inboard link 24 configured to connect to another unit. In the depicted embodiment, the unit has an overall length of less than ten millimeters, which enables the unit to move efficiently through ducts with bends. For example, a unit having an outer diameter of between four and five millimeters (about 4.5 mm) can be blown through a 5.5 mm inner diameter duct with a minimum bend radius of 70 mm.

In the depicted embodiment, the system can further include a display configured to visually display the duct configuration. The unit can also include a system that provides detailed data that can be imported into blowing performance software to provide recommended flow rate, blowing pressure, and locations for blowing for example. In the depicted embodiment, the system also includes a unit trap configured to be mounted to a far end of the duct to trap the unit as it exits the duct. It should be appreciated that the system can include fewer features or more features than are described herein.

The present disclosure also provides a method for mapping a duct including selecting a unit that has a diameter that is within 5-25 percent smaller than the diameter of a duct of which the unit is configured to be blown through; inserting a modular electrical unit into the selected unit, the modular electrical unit configured to track the position of the unit; blowing the unit through the duct while the modular electrical unit collects and stores data regarding the position of the unit; and mapping the duct based on the data collected by the unit.

The method can also include providing recommended flow rate, blowing pressure, and locations for blowing based on information collected by the unit and received by the processor. In addition it can also include providing information to another software application that visually displays the mapped route.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for mapping a path of a conduit, the system comprising:
   a conduit mapping unit configured to be advanced through the conduit, the conduit mapping unit including a body portion housing electrical components in the body portion, the electrical components operable to collect data defining a path of the conduit as the conduit mapping unit travels through the conduit; and
   a drive device comprising a mapping system blower configured to generate pressurized fluid to advance the conduit mapping unit through the conduit, the drive device being separate from the conduit mapping unit.

2. The system for mapping the path of the conduit of claim 1, wherein the electrical components further comprise a six degree of freedom microprocessor chip.

3. The system for mapping the path of the conduit of claim 1, wherein the electrical components further comprise a memory and a communication electronic component.

4. The system for mapping the path of the conduit of claim 1, wherein the conduit mapping unit further comprises a modular electrical unit, wherein the modular electrical unit comprises electrical components that are connected and configured to be removed from one unit and placed into another unit.

5. A method for mapping a path of a conduit, the method comprising:
   inserting a conduit mapping unit into a conduit, the conduit mapping unit including a body portion housing electrical components in the body portion, the electrical components operable to collect data defining a path of the conduit as the conduit mapping unit travels through the conduit; and advancing the conduit mapping unit through the conduit by a drive device including a mapping system blower configured to generate pressurized fluid to blow the conduit mapping unit through the conduit while the conduit mapping unit collects and stores data defining a path of the conduit.

6. The method for mapping the path of the conduit of claim 5, further comprising selecting a conduit mapping unit that is in a range from 5 to 25 percent smaller than the diameter of the conduit.

7. The method for mapping the path of the conduit of claim 5, further comprising providing the data defining the path of the conduit to a computing system to generate cable installation parameters based on the data defining the path of the conduit.

8. The method for mapping the path of the conduit of claim 7, wherein generating cable installation parameters based on the data defining the path of the conduit comprises generating a recommended flow rate and a recommended blowing pressure.

9. A method for mapping a path of a conduit, the method comprising:
   inserting a conduit mapping unit into a conduit, the conduit mapping unit including a body portion housing electrical components in the body portion, the electrical components operable to collect data defining a path of the conduit as the conduit mapping unit travels through the conduit;
   using a drive device separate from the conduit mapping unit, advancing the conduit mapping unit through the conduit, wherein advancing the conduit mapping unit through the conduit comprises generating pressurized fluid using the drive device to advance the conduit mapping unit through the conduit; and
   using the conduit mapping unit, collecting the data defining the path of the conduit.

10. The method for mapping the path of the conduit of claim 9, wherein advancing the conduit mapping unit through the conduit additionally comprises pulling the conduit mapping unit through the conduit using a pull cord.

11. The method for mapping the path of the conduit of claim 9, further comprising providing the data defining the path of the conduit to a computing system to generate cable installation parameters based on the data defining the path of the conduit.

12. The method for mapping the path of the conduit of claim 11, wherein generating cable installation parameters comprises generating detailed data that can be imported into performance software to provide a recommended force for advancing the conduit mapping unit and a recommended rate for advancing the conduit mapping unit.

13. The method for mapping the path of the conduit of claim 9, further comprising operating a cable installation system according to the cable installation parameters to install a cable into a conduit.

14. The method for mapping the path of the conduit of claim 9, further comprising driving the conduit mapping unit through the conduit a plurality of times using the drive device.

15. The system for mapping the path of the conduit of claim 1, wherein the drive device further comprises a puller configured to pull the conduit mapping unit using a pull cord.

16. The system for mapping the path of the conduit of claim 15, wherein the conduit mapping unit further comprises a pulling eye, wherein the pull cord is configured to couple to the pulling eye and pull the conduit mapping unit.

17. The system for mapping the path of the conduit of claim 1, wherein the drive device further comprises a pusher configured to push the conduit mapping unit through the conduit.

\* \* \* \* \*